No. 834,151. PATENTED OCT. 23, 1906.
T. H. & J. W. MONAHAN.
BRAKE LEVER.
APPLICATION FILED JAN. 27, 1906.
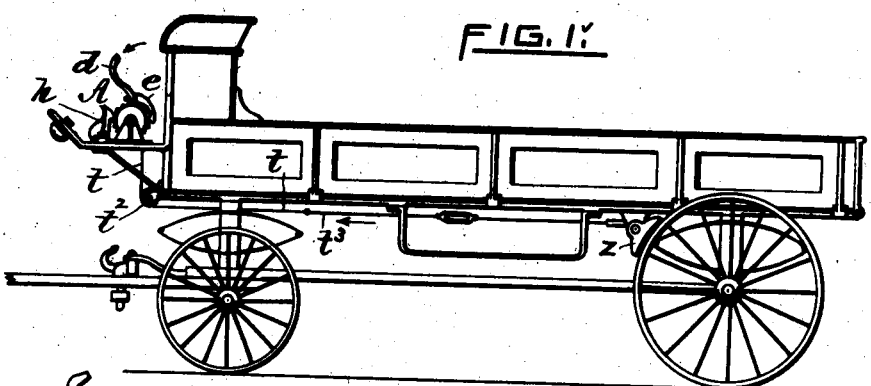
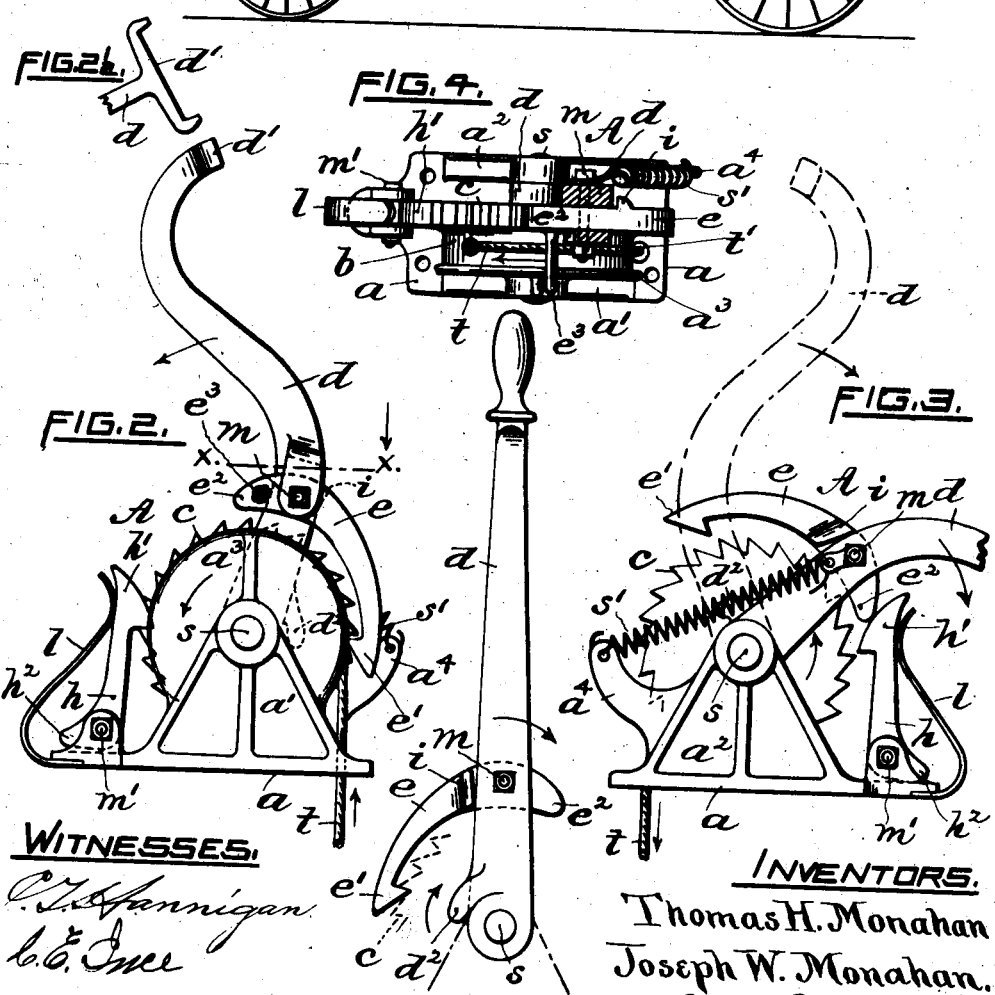
WITNESSES.
O. T. Flannigan
C. E. Tree
INVENTORS.
Thomas H. Monahan
Joseph W. Monahan
By Geo. F. Remington
Atty.

UNITED STATES PATENT OFFICE.

THOMAS H. MONAHAN AND JOSEPH W. MONAHAN, OF PROVIDENCE, RHODE ISLAND.

BRAKE-LEVER.

No. 834,151.  Specification of Letters Patent.  Patented Oct. 23, 1906.

Application filed January 27, 1906. Serial No. 298,132.

*To all whom it may concern:*

Be it known that we, THOMAS H. MONAHAN and JOSEPH W. MONAHAN, citizens of the United States of America, and residents of Providence, in the county of Providence and State of Rhode Island, have invented certain new and useful Improvements in Brake-Operating Devices for Vehicle-Brakes, of which the following is a specification.

Our present invention relates to novel improvements in brake-operating mechanism for vehicle-brakes, the invention being more particularly adapted for use in vehicles or drays employed for conveying or transporting heavy loads or loads too great to be readily controlled by the horses or hauling or propelling power of the vehicle when descending hilly roads or streets having a downgrade—that is to say, the device is made operative by the driver or teamster to actuate or "set" the brake as occasion demands, thereby temporarily checking or even stopping the rotation of the traction or brake wheels of the moving vehicle.

In devices of the class forming the subject of our invention and wherein an operating-lever and pawl-and-ratchet mechanism are included in the construction thereof the arrangement is usually such that the driver is necessarily obliged to manually actuate the same in order to operate the brake. In some cases, however, as is well known, the braking effect is accomplished by a simple treadle or foot-actuated lever connected directly with the brake. In such former mechanisms the brakes when set were released only through the medium of manual power. It is obvious that at times the conditions or circumstances may be such that the brake cannot be readily released at the proper or desired instant, owing to the fact that both the hands of the driver are then holding the reins of several horses. Therefore time is lost both in changing the reins to free one hand and in rearranging the reins after the brake has been freed. Moreover, there is the risk of his losing control of the team, temporarily at least.

By means of our improved brake-operating mechanism the brake itself is at all times under instant control, the same being effected by means of a self-locking ratchet-and-pawl arrangement, combined with a readily-accessible swinging foot-actuated self-retracting operating-lever, the oscillating or swinging movements of which latter when in use gradually impart the desired amount of tension or take-up to the flexible brake connection leading therefrom to the brake proper.

In our device the construction is such that upon forcing the lever ahead to its limit certain means connected therewith operate to quickly and automatically disengage both the driving and locking pawls or members from the ratchet-wheel, thereby freeing the latter and permitting it and the barrel which carries the cable or flexible portion of the brake connection to turn rearwardly or backward, thus slackening the cable and relieving the brake tension. Upon removing the power or foot-pressure from the operating-lever the latter automatically returns, say, to its rearward stationary or normal position. At substantially the same instant that the lever commences its rearward movement the check-pawl reëngages the ratchet-wheel and locks or holds it stationary, while the continued rearward movement of the lever carries the driving-pawl idly over the ratchet-teeth until the lever is arrested, at which instant its pawl drops into working engagement with the adjacent tooth, the several parts then being in position to retighten the cable and set the brake upon again advancing the operating-lever, all as will be more fully hereinafter set forth and claimed.

In the accompanying sheet of drawings, Figure 1 is a side elevation representing a vehicle provided with any suitable brake and also showing our improved brake-operating device connected therewith. Fig. 2 is a front side view of the said device in enlarged scale, the parts being in the normal stationary or retracted position. Fig. 2½ represents a plan view of the upper end of the operating-lever. Fig. 3 represents the rear side of the device, but showing the operating-lever and pawls in the extreme forward position, said position corresponding to that when the pressure on the brake connection is to be quickly released. Fig. 4 is a plan view, in partial section, the latter being taken on line *x x* of Fig. 2; and Fig. 5 is a front view showing a modified form of the operating-lever.

Our improved brake-operating device A is well adapted for use on practically all types of wheeled vehicles in which brakes proper are employed—that is to say, brakes having shoes or analogous members arranged to frictionally engage the periphery of the traction or other wheels. The device may be also suitably mounted and employed for hauling or lifting heavy weights without changing its construction and arrangement.

In Fig. 1 of the drawings the vehicle represented may be provided with any well-known braking mechanism, the same being located, as usual, under the vehicle's body and having swinging brake-shoes $z$, adapted to frictionally engage the tires of the rear traction-wheels. A link $t^3$ extends from the brake toward the front of the vehicle and is fastened to a small flexible wire cable $t$, passing round an idler-pulley $t^2$, and thence upwardly through the footboard to the small drum or barrel of said device A, the latter being secured to said footboard and conveniently located so that the operating-lever $d$ thereof may be readily engaged and actuated by the foot of the driver or operator.

The device A as drawn has a base $a$ provided with laterally-separated front and rear side or upright frames $a'$ $a^2$, respectively. They are bored to form bearings for the short shaft $s$, on which are mounted the cable-carrying barrel $b$, ratchet-wheel $c$, and operating-lever $d$. The front frame has a disk-like guide-flange $a^3$ extending beyond the periphery of the barrel to prevent the cable $t$ from moving too far in a lateral direction. It may be stated that as drawn the said members $c$ and $b$ are or may be integral, so as to move in unison. The lever $d$ oscillates on the shaft $s$, the former extending upwardly and terminating in the lateral enlargement $d'$, arranged to form a convenient bearing or seat for the foot of the operator. At a suitable distance above the wheel $c$ the driving or bent hook-pawl $e$ is pivoted at $m$ to the lever $d$. The forward end portion $e^2$ of the pawl extends beyond the lever and is cam-shaped. The opposite or rear end portion has a hook $e'$ to engage the ratchet-teeth, the arrangement being such that the said hook end bears against and engages the teeth by gravity when in normal action. The rear frame $a^2$ has a fixed arm $a^4$, carrying an end of a helical spring $s'$, the other end being secured to a short link mounted on the pivot pin or bolt $m$. The object of this spring is to automatically retract or return the lever and its pawl to the normal stationary position. A lug or stop $d^2$ of the lever serves to arrest or limit said movement when the former engages the frame $a'$, all as shown in Fig. 2.

The front end of the base $a$ is extended and provided with vertical ears, in which, at $m'$, the check or locking pawl $h$ is pivoted. Said pawl is resisted by a fixed spring $l$, thereby keeping the elongated hook end $h'$ in normal engagement with the ratchet-wheel and its teeth. The lower or heel end of the pawl is extended at $h^2$ and is adapted to bear against the base when the pawl is forced rearwardly from the ratchet, thus forming a strong limit-stop.

In operating the improved device A, assuming the same to have been suitably mounted and secured, say, to the footboard of the vehicle and having the cable $t$ secured to the barrel $b$ and passing downwardly therefrom through the base-opening $t'$, Fig. 4, and around the guide-sheave $t^2$ and finally secured to the brake-link $t^3$, the driver or user actuates the lever $d$ back and forth through the medium of power applied thereto by his foot and the retracting-spring $s'$, thereby taking up the "slack" of the cable and the play of the several joints of the brake proper and finally causing the brake-shoe $z$ to snugly engage the traction-wheels substantially as indicated in Fig. 1. The degree of frictional contact between the shoe and wheel corresponds to the amount of power or force exerted upon the lever $d$. Meanwhile the cable is kept taut and the barrel $b$ immovable by the combined action of the spring-pressed check-pawl $h$ and ratchet-wheel $c$. Now in order to release the brake $z$ from the wheel the lever $d$ is advanced to its limit, (see Fig. 3,) whereby the forcible engagement of the cam end $e^2$ of the driving-pawl with the corresponding end $h'$ of the check-pawl $h$ coöperate to force the latter from the toothed wheel and at the same time swinging the pawl $e$ upwardly and withdrawing its end $e'$ from said wheel, the barrel then being free to move axially in either direction. It will be seen that the operating-lever is positively prevented from further forward movement by reason of the engagement of the lower extension $h^2$ of pawl $h$ with the base $a$. The pawl $e$ is provided with a lug $i$, which is adapted to contact with the lever $d$, and thus limit its upwardly-swinging movement. (See Fig. 3.) Said lug may also be arranged to prevent the pawl from dropping too far. (See Fig. 5.) In said Fig. 5 the operating-lever $d$ is represented as being provided with a handle member. This construction may be employed in some cases. We prefer, however, to make the lever substantially as shown in Fig. 2. wherein it is arranged to be actuated by foot-pressure. In the event that the brake tension upon the cable and device is such at any time that the operating-lever cannot be advanced sufficiently to insure the engagement of the two pawls with each other to free them from the ratchet-wheel, as shown in Fig. 3, then in such case the operator places his other foot upon and presses downwardly on the laterally-extending lug or pin $e^3$, secured to or integral with the cam end $e^2$ of the driving-pawl, (see Figs. 2 and 4,) thereby swinging the latter upwardly from the ratchet-wheel, immediately after which the lever is advanced, as before described, until the coöperating action of both pawls positively withdraws pawl $h$ from the teeth of said wheel, the latter then being free to move axially.

We do not herewith claim, broadly, as our invention a braking device having an operating-lever provided with a pawl for rotating a drum carrying a cord through which the brake-shoe is applied to the tire of a vehicle-wheel.

We claim as our invention and desire to secure by United States Letters Patent—

1. In a device of the character described, the combination with a revoluble toothed barrel, a spring-pressed check-pawl $h$ in normal engagement therewith, and a stop for limiting the rearward movement of said pawl, of a swinging operating-lever $d$, a working pawl $e$ pivoted to the lever and in normal engagement with said barrel member, a stop for limiting the outward angular movement of said pawl $e$, and having the free ends $e^2$ and $h'$ of the pawls $e$ and $h$, respectively, arranged to engage with each other to throw them out of action when the lever $d$ is sufficiently advanced, substantially as described.

2. In a device of the character described, the combination of a revolubly-mounted toothed member, a swinging operating-lever $d$ having a lug arranged to engage a fixed part of the device to form a limit-stop, a pawl $e$ pivoted to said lever for rotating the toothed member in one direction, a stop $i$ coacting with the lever for limiting the upward or outward swinging movement of the pawl, a check-pawl $h$ for normally holding said toothed member in position against rearward movement, the ends $e^2$ and $h'$ of the respective pawls being cam-shaped so that when brought into engagement with each other by the forward movement of the lever both pawls are thereby automatically withdrawn from the toothed member, and a stop for limiting the last-named movements of the check-pawl and lever.

3. In a device of the character described, the combination of a suitably-mounted ratchet-wheel member, a swinging operating-lever adapted to be actuated by foot-pressure, a self-dropping pawl pivoted to and movable with said lever for rotating the ratchet-wheel in one direction, and having the heel or short end portion of the pawl provided with a lug or extension $e^3$ adapted to be engaged by the foot of the user to swing the pawl out of engagement with said wheel.

4. In a vehicle provided with traction-wheels, the combination with movably-mounted brake-shoes arranged with respect to said wheels, of brake-actuating mechanism comprising essentially a toothed barrel, a self-retracting swinging pawl-carrying operating-lever for rotating said barrel, a flexible connection mounted on the barrel and operatively connected with the brake-shoes, a spring-pressed check-pawl normally engaging said barrel, means integral with said pawls for disconnecting them from the barrel by the action of said lever when the latter is advanced beyond its normal working movement, and independent stops for limiting the angular movements of the pawls.

Signed at Providence, Rhode Island, this 26th day of January, 1906.

THOMAS H. MONAHAN.
JOSEPH W. MONAHAN.

Witnesses:
GEO. H. REMINGTON,
CALVIN H. BROWN.